May 8, 1951     E. A. WILCKENS     2,552,245
APPARATUS FOR HANDLING AND COATING STRIP MATERIAL
Filed May 24, 1945     9 Sheets-Sheet 1

Inventor:
Eibe H. Wilckens,
By Cushman, Darby & Cushman
Attorneys.

May 8, 1951  E. A. WILCKENS  2,552,245
APPARATUS FOR HANDLING AND COATING STRIP MATERIAL
Filed May 24, 1945  9 Sheets-Sheet 4

Fig. 5.

Inventor:
Eibe H. Wilckens,
By Cushman, Darby & Cushman
Attorneys

Patented May 8, 1951

2,552,245

UNITED STATES PATENT OFFICE 2,552,245

APPARATUS FOR HANDLING AND COATING STRIP MATERIAL

Eibe A. Wilckens, Baltimore, Md., assignor to Crown Cork & Seal Company, Inc., Baltimore, Md., a corporation of New York Application May 24, 1945, Serial No. 595,610

14 Claims. (Cl. 91—50)

This invention relates to apparatus for handling and treating strip material. The application is a continuation-in-part of my application for Methods and Apparatus for Handling and Treating Strip Material, Serial No. 352,645, filed August 14, 1940, issued June 25, 1946, as Patent No. 2,402,860.

The present invention contemplates apparatus whereby sheet or strip material may be coated, usually on both faces. It further contemplates apparatus whereby a sheet or strip may be dried after the coating has been performed. Difficulties arise in simultaneously coating both faces of a sheet of material with two different coatings, for example, coatings of two different colors, because the different coatings mingle at the edges of the sheet.

An object of the present invention is to provide apparatus for simultaneously coating both faces of sheet material and without danger of the coatings mingling at the edges of the sheet.

In coating continuous strips of material, the strip is very apt to shift laterally during its movement through the coating mechanism. If a coating is only to be applied to a certain area of such a strip, the lateral movement of the strip will result in the coating being applied out of register.

Another object of the invention is to provide apparatus whereby a sheet of material, for example, a continuously moving strip, can be coated in proper register regardless of lateral movement of the sheet material.

Another object of the invention is to provide a coating apparatus which is so constructed that the cylinders of the coating couple readily can be moved apart for cleaning and without losing their driving relationship.

In applying coating of various characters to strip material, it has been customary to provide means to move the strip through the apparatus and, in addition, provide a separate means to drive a coating cylinder. Another object of the invention is to provide a coating apparatus wherein the coating means is driven by the movement of the strip being coated.

A still further object of the invention is to provide a coating apparatus including means to drive the coating elements from the strip and which includes highly efficient arrangements for controlling the position of the coating means driving elements.

Another object of the invention is to provide means for bowing a sheet or strip so that it can be supported at its edges and, thereby, the coating will not be marred, and for supporting the strip at its edges.

A further object of the invention is to provide an improved conveyor for handling materials during high temperature treatment and which includes means to hold the conveyor at a constant tension regardless of temperature changes and resultant lengthwise expansion or contraction of the conveyor.

Other objects and advantages of the invention will be apparent from the following specification and accompanying drawings wherein.

Figure 1:
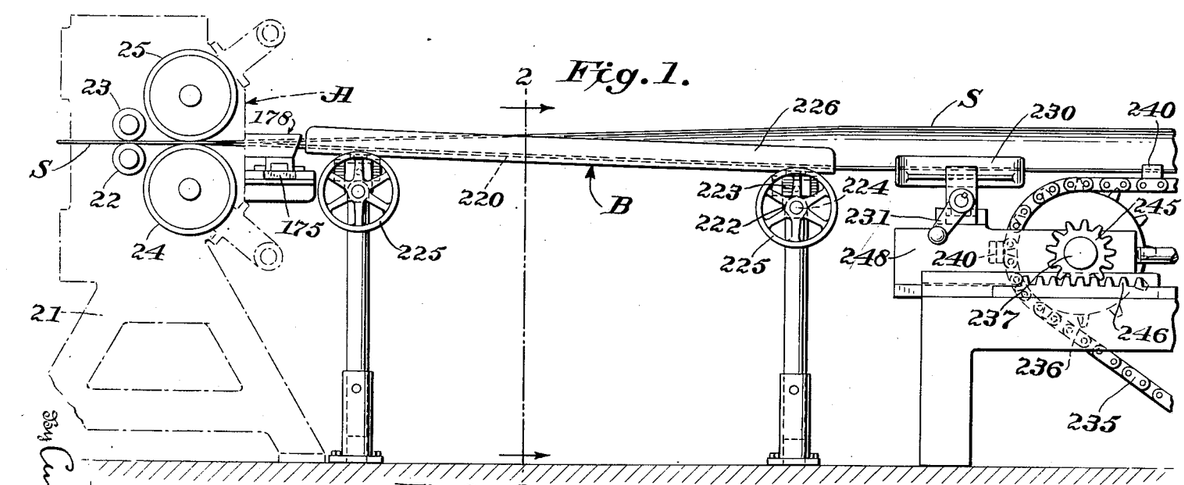
Figure 1 is a side elevation of the apparatus of the invention.

The strip S to be handled by the apparatus of the present application will be delivered from the left of Figure 1 to the coating mechanism A from an uncoiling drum such as disclosed in said original application and after movement through a looper. After being coated, the strip moves between the strip bowing means B indicated in Figures 1, 2 and 10 which bows the strip so that its edges will be supported on sheet supporting elements C illustrated in Figure 10. The elements C are carried by a conveyor chain D which supports and assists in moving the strip through a drying oven of the type disclosed in said original application. The present invention includes a pressure operated conveyor tensioning means E whereby the conveyor D will be held under proper tension regardless of such expansion of the conveyor as will occur because of the high temperature in the drying oven.

Figure 3:
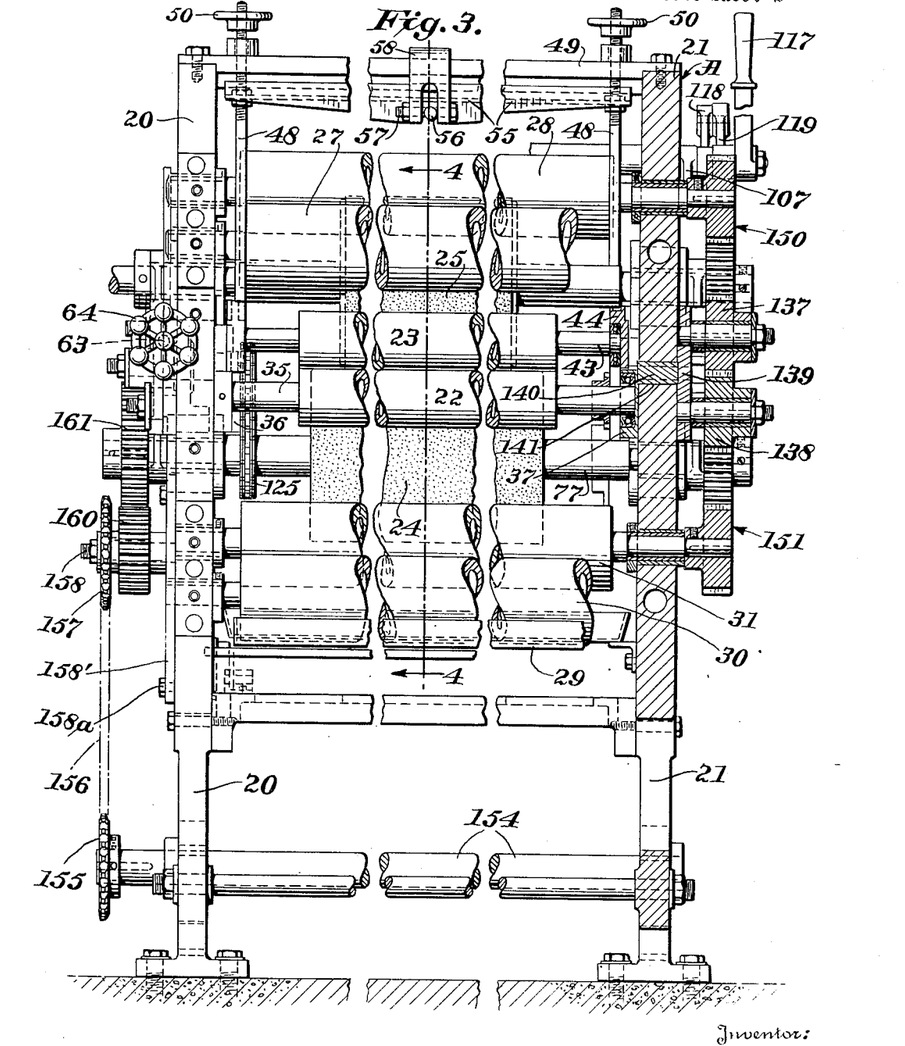
Figure 3 is an elevation of the infeed side of the coating mechanism, the right hand portion of this view being a vertical section on the line 3—3 of Figure 6.

The coating machine A is illustrated in detail in Figures 3 to 8 and 12. In hereinafter discussing coating machine A, the face of the machine into which the strip moves, i. e., the left-hand portion in Figure 1, will be considered as its front. Figure 3 is a view looking toward the front face of the machine and, therefore, a supporting side frame 20 shown at the left in that view is the left-hand side frame, while the other side frame 21 is the right-hand side frame. The face of machine A out of which the coated strip moves will be regarded as its back or rear.

Figure 6:
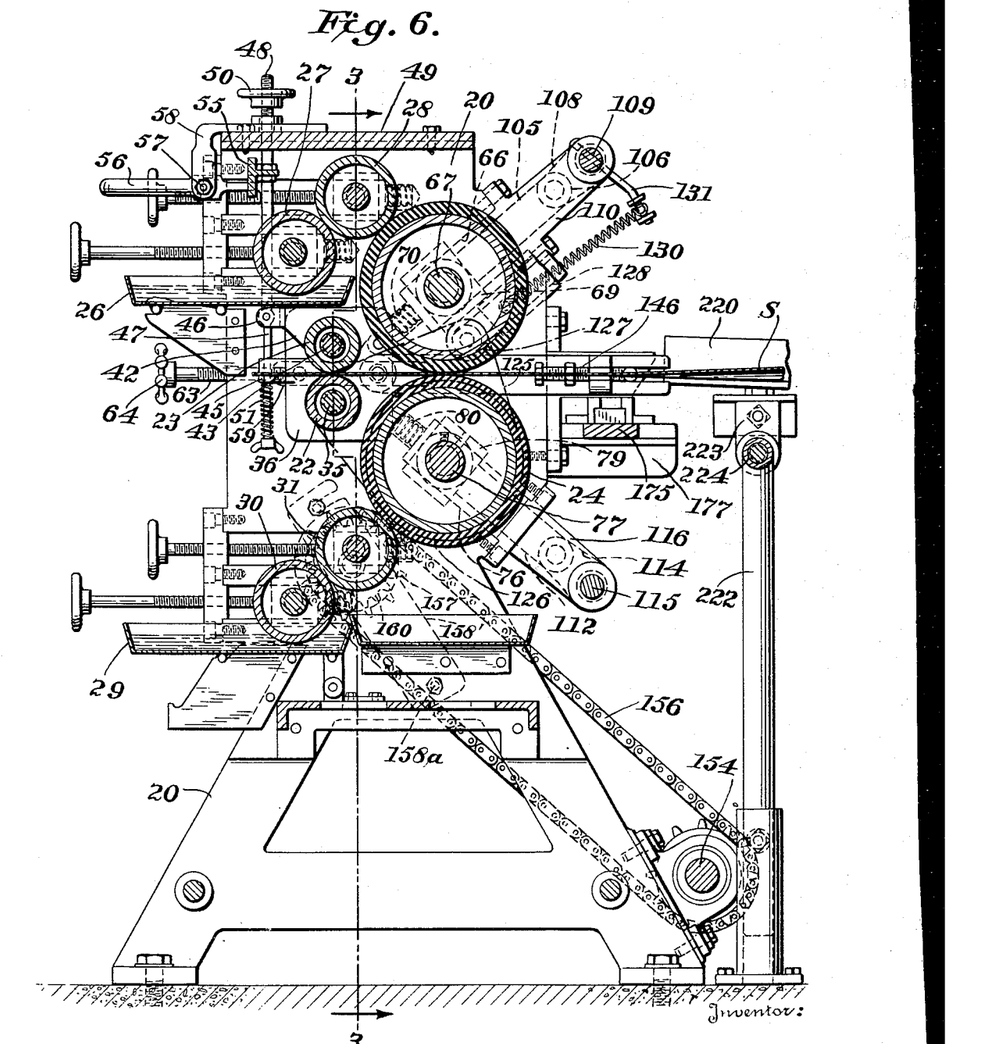
Figure 6 is a central longitudinal section of the coating mechanism, the section also being taken on the line 4—4 of Figure 3.

The principal rolls or cylinders supported in the side frames 20 and 21 comprise a lower pinch roll 22, an upper pinch roll 23, a lower coating cylinder 24 and an upper coating cylinder 25. In addition, as best shown in Figure 6, a coating fountain or tray 26 is mounted between the side frames adjacent the upper coating cylinder 25 and a fountain roll 27 and form roll 28 deliver the coating from fountain 26 to the upper cylinder 25. A second fountain or tray 29 has a fountain roll 30 and form roll 31 positioned between it and the lower coating cylinder 24 to deliver coating to the latter cylinder.

Figure 4:
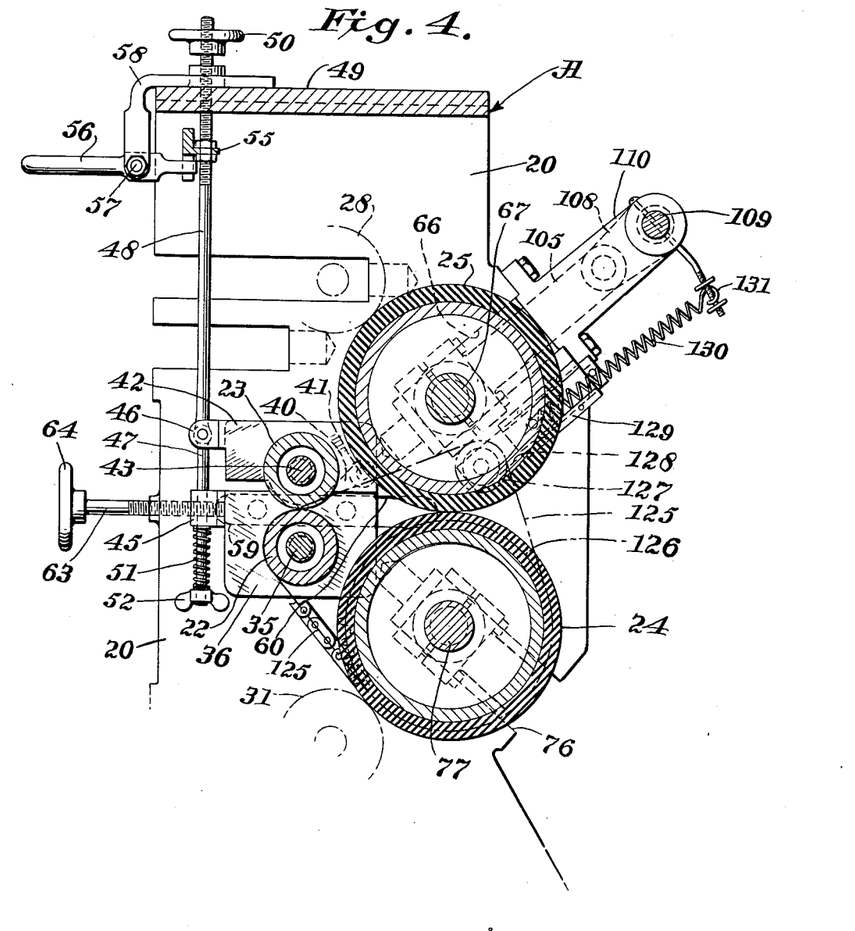
Figure 4 is a vertical section on the line 4—4 of Figure 3, but showing only the pinch rolls and coating cylinders and portions of their mountings and drive.

The manner in which the pinch rolls 22 and 23 are supported and adjusted is best shown in Figures 3, 4 and 6. Referring to these figures, the lower pinch roll 22 includes a shaft 35 having its left-hand end journaled in a block 36 horizontally slidable on the inner surface of the left-hand side frame 20 (Figures 4 and 6) as hereinafter described. The other end of shaft 35 is journaled in a block 37 (Figure 3) fixed to the inner wall of the right-hand side frame 21. The block 36 (Figure 4) includes an upward extension 40 on which an upper block 42 is pivoted at 41. The left-hand end of shaft 43 of the upper pinch roll 23 is journaled in upper block 42 and its right-hand end is journaled in a block 44 which is pivoted to block 37 in the same manner as has just been described in connection with upper block 42.

Figure 5:
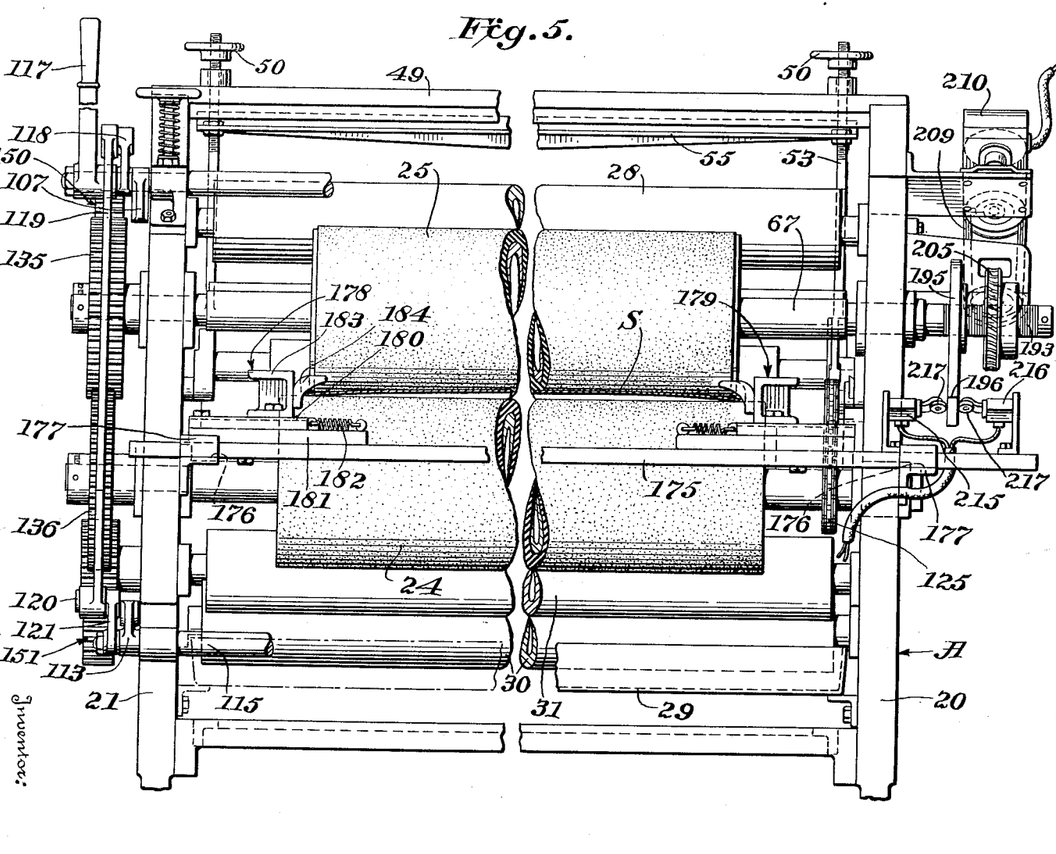
Figure 5 is an elevation of the outfeed side of the coating mechanism.

In order to normally hold the upper pinch roll 23 down toward the lower pinch roll 22, but enable roll 23 to be moved upwardly, the following structure is provided: Each of the lower pinch roll supporting blocks 36 and 37 is provided with a forward extension 45 such as shown in Figure 4 on the lower block 36. The upper blocks 42 are each provided with an extension 46. At each side of the machine a rod 47 extends through a vertical aperture in the lower extension 45 and is pivotally connected to the extension 46 of the upper block 42. A rod 48 continues upwardly from each upper block 42 to the top plate 49 of the coating mechanism frame. The upper end of each rod 48 is threaded to receive an adjusting wheel 50 and a spring 51 surrounds the lower portion of each rod 47 between the lower block extensions 45 and a head 52 provided on each rod. The springs 51 force the lower ends 52 of the rods 47 downwardly with the result that the upper blocks 42 and 44 and upper pinch roll 23 are under spring tension. The hand wheels 50 bear upon the top frame 49 of the coating mechanism as best indicated in Figure 5, being held upon the top frame by the springs 51. By rotation of these hand wheels, the pressure of the upper pinch roll 23 with respect to the lower pinch roll 22 may be adjusted and can be held at a desired tension to cause the pinch rolls to be driven by the strip S. The strip S is driven or drawn through the pinch rolls 22 and 23 by a driven rewinding drum positioned at the far end of the drying oven and by frictional contact of the strip edges with the strip engaging elements C of the oven conveyor D as hereinafter described.

Still referring to Figure 5, the rods 48 are secured to a cross bar 55 positioned just beneath the top frame 49. Intermediate its length, cross bar 55 is engaged by a hand lever 56 pivoted at 57 in a bracket 58 secured to the top frame 49. In the event that the operator wishes to release the tension exerted by upper pinch roll 23, he may move lever 56 downwardly to thereby lift the cross bar 55 and the rods 48 so that the upper blocks 42 and 44 will swing on their pivots 41 to hold the upper pinch roll 43 upwardly until the lever 56 is released.

Figures 11, 12:
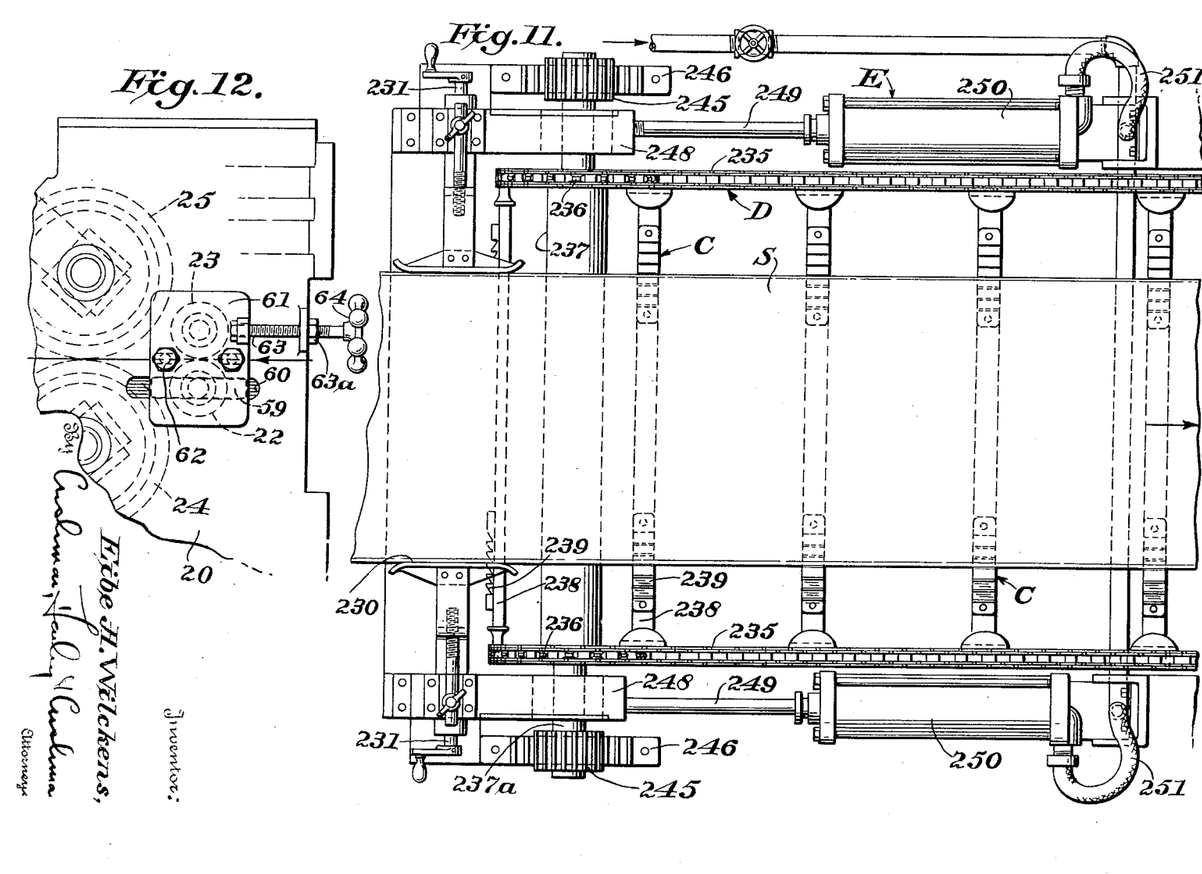
Figure 11 is a plan view showing the interior of of the infeed end of the drying oven.
Figure 12 is a fragmentary elevation showing the pinch roll adjusting mechanism, the view looking toward Figure 3 from the left of that figure.

It is desirable to have the pinch rolls 22 and 23 so mounted that one end of these rolls may be swung longitudinally of the strip S, that is, forwardly or backwardly with respect to the frame of the coating machine. To accomplish this, a horizontal rib 59 (Figure 4) is provided on the lower block 36 at the left-hand side of the coating mechanism, the rib fitting in a horizontal slot 60 in side frame 20. As shown in Figure 12, rib 59 has a plate 61 secured thereto and which bears on the outer surface of side frame 20. Bolts 62 passing through slots in plate 61 serve to further secure it to frame 20. Plate 61 has a rod 63 rotatably connected thereto as best shown in Figures 4 and 12. Rod 63 is threaded in the frame 20 as shown at 63a and is provided with an operating handle 64 at the front-edge of frame 20. Rotation of rod 63 will move the plate 61 and the left-hand journal blocks 36 and 42 longitudinally of the strip to thereby move that end of the pinch rolls 22 and 23 in a corresponding direction, i. e., toward or from the coating cylinders 24 or 25.

The pinch rolls will swing as described above with the opposite ends of their shafts carried in the blocks 37 and 44 serving as pivots. The purpose of this swinging movement of the pinch rolls is to enable them to be kept substantially at right angles to the moving strip S and is necessary because the strip may be moving into the coater A at a very slight angle because of faults in the coil or roll on the uncoiling drum. The swinging is so slight that the journals at the right-hand end of the pinch roll shafts 35 and 43 will readily accommodate it.

Figure 7:
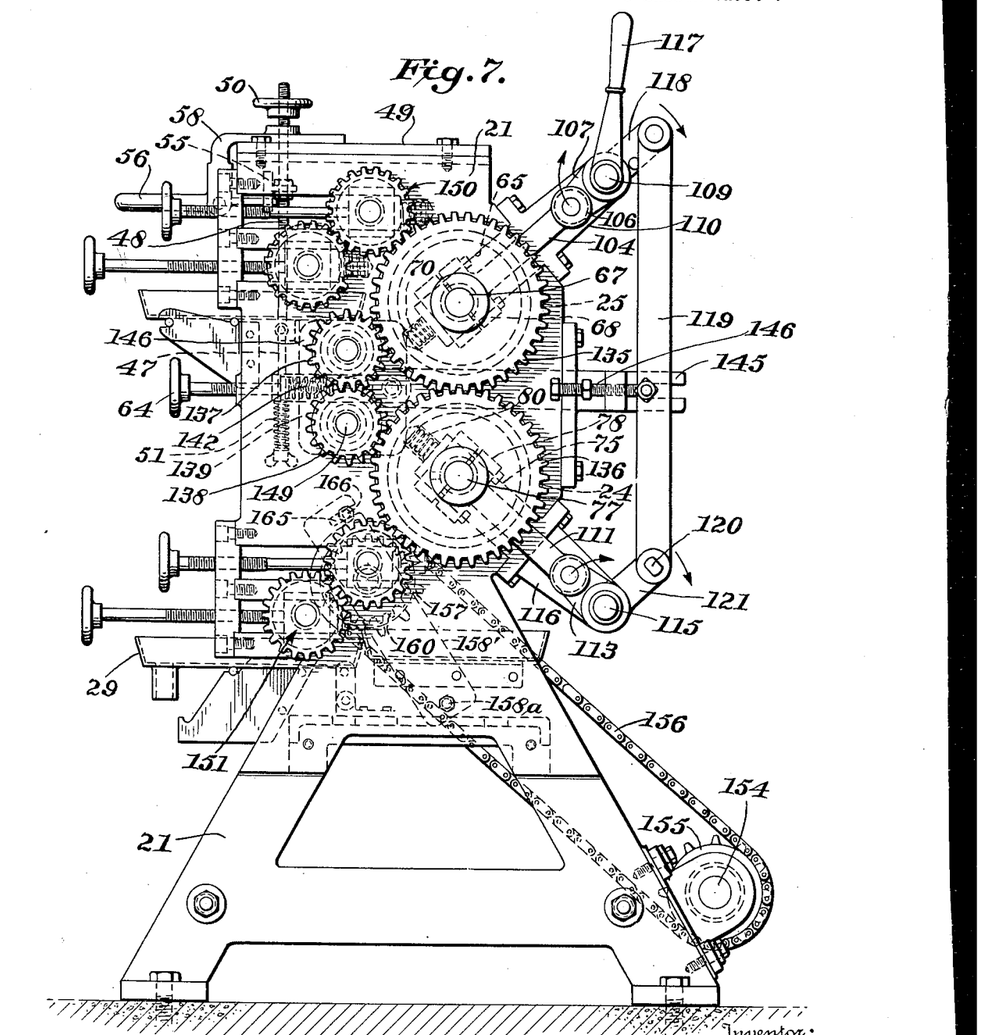
Figure 7 is a side view of the right hand side of the coating mechanism. That is, the view looks toward Figure 3 from the right of that figure.

The manner in which the coating cylinders 24 and 25 are supported is as follows: Referring to Figure 7, the right-hand side frame 21 is provided with an upwardly and rearwardly inclined slot 65 and the left-hand side frame 20 (Figure 6) is provided with the corresponding slot 66. The upper coating cylinder 25 includes a shaft 67 which is mounted in bearings 68 and 69 respectively carried in the slots 65 and 66. At their inner ends, the slots 65 and 66 are reduced to form pockets for springs 70. The right-hand side frame 21 is also provided with a downwardly and rearwardly inclined slot 75 and a similar slot 76 is formed in the left-hand side frame 20. The lower coating cylinder 24 includes a shaft 77 journaled in bearing blocks 78 and 79 which are respectively slidable in the slots 75 and 76. A spring 80 is mounted in a pocket at the inner end of each of the slots 75 and 76.

The blocks 68 and 69 which carry the upper cylinder shaft 67 have links 104 and 105 respectively pivoted thereto, the links extending upwardly to be pivotally connected at 106 to cranks 107 and 108 respectively secured to a cross-rod 109 journaled in extensions 110 on the side frames 20 and 21. The bearing blocks 78 and 79 which support the lower cylinder shaft 77 pivotally carry links 111 and 112, respectively, which have their outer ends pivotally connected to cranks 113 and 114 secured to a cross-rod 115 rotatable in extensions 116 of the side frames. An operating handle 117 or throw-out lever is secured to one end of the uppermost cross-rod 109 and this upper cross-rod carries a second crank 118 which is pivotally connected to the upper end of a vertically extending link 119. The lower end of the link 119 is pivotally connected at 120 to a second crank 121 secured to the lower cross shaft 115. By rotation of the handle 117, the journals of the coating cylinders 22 and 23 may be moved toward and away from each other and the strip S in the diverging slots 65 and 66, 75 and 76 in the side frames. As shown by the arrows in Figure 7 adjacent lever 117, clockwise movement of lever 117 with respect to that figure will move the journals apart or outwardly.

The coating cylinders 24 and 25 are initially driven from the lower pinch roll 22. Referring to Figures 4 and 5, the left-hand end of the lower pinch roll shaft 35 carries a sprocket which engages a sprocket chain 125 and which chain engages a sprocket wheel 126 fixed to the shaft 77 of the lower coating cylinder 24. Chain 125 also moves about an idler 127 mounted on a slide 128 which is movable in a slideway 129 in the left-hand side frame 20. Slide 128 and idler sprocket 127 are urged outwardly in the slideway 129 by a tension spring 130 having its inner end secured to the slide and its outer end connected to the cross-rod 109. It will be observed that as cross shaft 109 is rotated in a clockwise direction as viewed in Figures 4 and 7 to thereby move the lower coating cylinder 24 downwardly and to the right in Figure 4, arm 131 will swing clockwise to thereby permit slide 128 and idler 127 to move downwardly and to the left in Figure 4. As a result, the outward movement of the coating cylinder shaft 77 will be accommodated and the sprocket chain 125 will be kept under normal tension.

In order to drive the upper coating cylinder from the lower cylinder, the shaft 67 of the upper cylinder 25 and the shaft 77 of the lower cylinder 24 are respectively provided with pinions 135 and 136 at their right-hand ends and outwardly of the right-hand side frame 21. These pinions fully mesh when the cylinders are in normal coating relationship, shown in Figure 7. However, the pinions 135 and 136 will move somewhat away from each other when the cylinders are moved apart by operation of the throw-out lever 117. In order to hold the teeth of the pinions in such relationship that they will properly engage when again moved together, and also to maintain a fully engaged driving connection between them, they are also connected by the gear train comprising the pinions 137 and 138.

The pinions 137 and 138 are journaled on a plate 139 mounted on the outer wall of side frame 21. Plate 139 includes a rib 140 extending into a horizontal groove 141 in the side frame 21. The rib 140 is engaged by a spring 142 which urges the plate 139 and the pinions 137 and 138 to the right as viewed in Figure 7. When the coating cylinder throw-out lever 117 is swung to the right in Figure 7 to move the cylinders apart, the link 119 will be moved to the right and downwardly. The movement of link 119 to the right will enable an arm 145 connected to plate 139 and engaging link 119 to also move to the right so that spring 142 will be free to keep pinions 137 and 138 in mesh with the pinions 135 and 136 when the latter move apart. A set screw 146 carried by arm 145 can be adjusted to control the extent to which spring 142 can move arm 145 to the right in Figure 7 and thereby determines the depth to which the pinions 137 and 138 mesh with the coating cylinder pinions 135 and 136.

As a result of the connections just described, when the coating cylinders 24 and 25 are moved apart along diverging lines, the pinions 137 and 138 will be moved to the right in Figure 7 along a line bisecting the angle between the lines along which the cylinders move. Therefore, even though the pinions 135 and 136 carried by the coating cylinder shafts may move to a partially disengaging position, these pinions will be held in proper relationship by the small pinions 137 and 138.

The fountain rolls 27 and 30 and form rolls 28 and 31 are driven by the trains of gears generally designated 150 and 151 in Figure 7. The shafts carrying these rolls are mounted in horizontal slideways as also shown in Figure 7 so that their positions with respect to the coating cylinders and each other may be adjusted by means of threaded rods illustrated in Figure 7.

Referring to Figures 7 and 3, a shaft 154 driven by a motor, not shown, may be journaled in the frame of the coating machine and this shaft carries a sprocket 155 with a sprocket chain 156 extending therefrom to a sprocket wheel 157 fixed to a stub shaft 158 carried by a plate 158′ pivoted on the left-hand side frame 20 at 158a. Shaft 158 carries a pinion 160. The plate 158′ can be swung on its pivot to cause pinion 160 to mesh with a pinion 161 secured to the left-hand end of the lower coating cylinder shaft 77. By this arrangement, the rolls and cylinder of the apparatus can be rotated during cleaning or similar operations or at any time when the apparatus is not being operated by movement of a strip S therethrough. The plate 158′ is provided with a slot 165 adapted to move about a bolt 166 in side frame 20 and a nut on the bolt will hold plate 158′ and thereby pinion 160 in either engaged or disengaged position with respect to coating cylinder shaft pinion 161.

The fact that the coating machine of the present invention is driven by engagement of the pinch rolls 22 and 23 with the strip S being moved through the machine eliminates the necessity of a driving motor for the coating machine. In addition, it insures that the coating rolls will move at the proper speed with respect to the strip S.

*Coating cylinder aligning mechanism*

As has been pointed out above, when a strip of material or the like is being simultaneously coated on both sides with coatings of different colors or types, it is necessary to prevent the coatings from becoming mixed at the edges of the strip. Also, it is necessary to insure that one coating cylinder will not contact with the other coating cylinder. In order to prevent the coatings from mixing at the edges of the strip, it is desirable to leave an uncoated margin at each edge of one face of the strip. If this is done, the other face may be coated over its entire surface. However, a long strip of steel or tinplate moving from an uncoiling drum may shift laterally. Therefore, when applying the just-mentioned procedure to a long strip, it is desirable to mount at least one of the cylinders of the coating couple, preferably the upper cylinder, so that this cylinder will shift axially in accordance with any lateral shifting of the strip.

Figures 8 to 10 and 5 disclose a mechanism for maintaining the upper coating cylinder 25 in alignment or registration with the strip S. This mechanism comprises a detector bar 175 which extends transversely of the strip S and is supported in slideways 176 provided in brackets 177 which extends forwardly from the side frames 20 and 21 of the coating mechanism. The bar 175 is positioned beneath the strip S as shown in Figure 5. Detector bar 175 carries sheet edge engaging elements generally designated by the numerals 178 and 179. Each of these elements includes a slide 180 mounted in a slideway 181, with a spring 182 connected to the inner end of each slide 180 to hold it against a stop on the slideway 181. Each slide 180 carries a bracket 183 including a shoe 184 having its inner face curved upwardly and toward the center of strip S to contact with and partially overhang the adjacent edge of strip S. By the provision of the elements 178 and 179, the detector bar 175 will be held in a predetermined position with respect to the width of the strip S.

Figure 8:
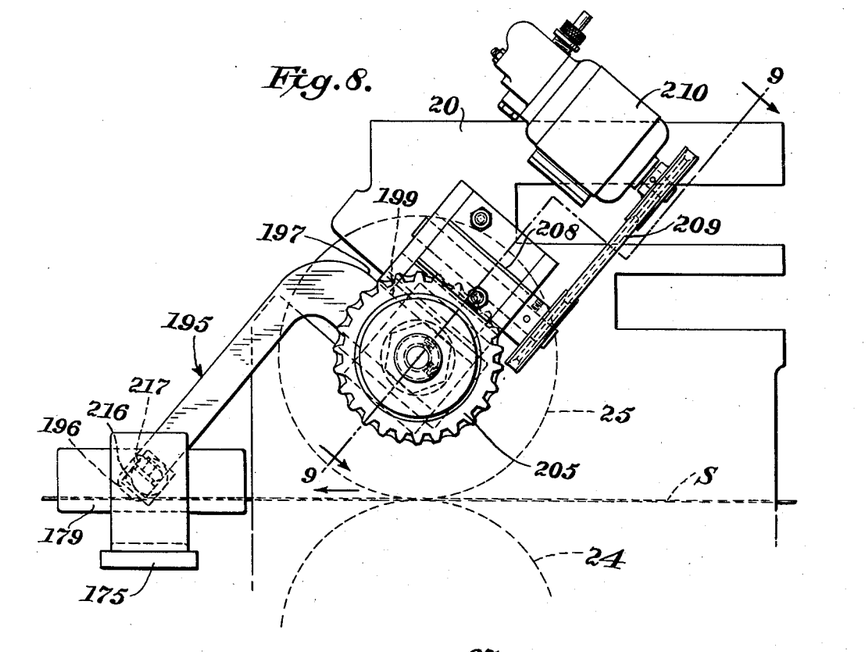
Figure 8 is a side elevation of the roll centering mechanism, the view looking toward Figure 5 from the right of that figure.
Figure 9:
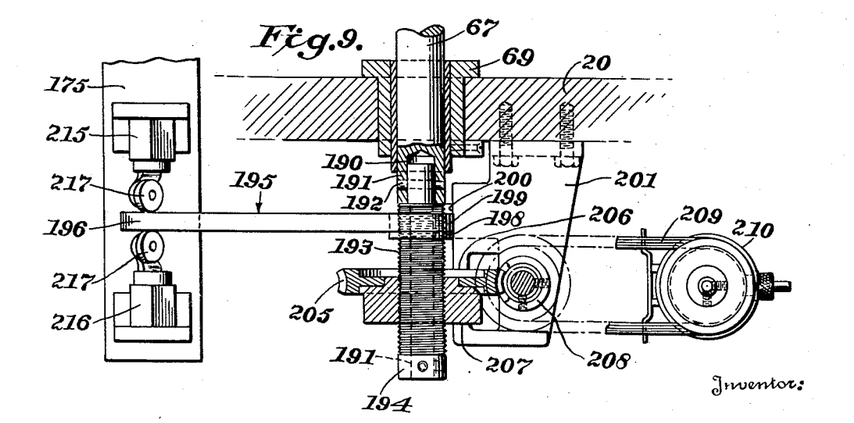
Figure 9 is a sectional view on the line 9—9 of Figure 8, with portions in plan.

As best shown in Figure 9, the shaft 67 which carries the upper coating cylinder 25 is provided with a socket or recess 190 in its left-hand end. A stub shaft 191 extends into the socket 190 and has its inner end firmly secured in the socket by any suitable means such as the pin 192. A threaded sleeve 193 is rotatably mounted on the stub shaft 191, the inner end of sleeve 193 bearing upon the outer end of shaft 67 and its outer end contacting with a collar 194 secured to the outer end of the shaft. An angled bar or striker 195 is mounted on the threaded sleeve 193, this striker including two arms 196 and 197 as shown in Figure 8. The arm 197 is apertured at its outer end to fit rotatably upon a flanged collar 198 threaded on sleeve 193. Collar 198 may be secured in adjusted position on sleeve 193 by a set screw. The outer and upper face 199 of arm 197 is flat and contacts with a flat face 200 of a bracket 201 secured to the outer surface of the side frame 20. The contact of the face 199 of striker 195 with the face 200 will prevent the striker rotating with the collar 198 and threaded sleeve 193 and will hold it in the vertical position with respect to that sleeve illustrated in Figure 8. The position of striker 195 axially of sleeve 193 can be adjusted by threading collar 198 along sleeve 193.

A worm wheel 205 is threaded on the sleeve 193, worm wheel 205 having both side faces thereof in close contact with abutments 206 and 207 which extend from the bracket 201 to enclose a portion of the worm wheel. A worm shaft 208 meshes with the worm wheel 205, shaft 208 being journaled in the bracket 201 and driven through a pulley and belt connection 209 from a reversible motor 210.

As best shown in Figure 5, the depending arm 196 of striker 195 extends between a pair of opposed electrical switches 215 and 216 carried at the left-hand end of the detector bar 175. Each switch preferably includes a roller 217 adapted to contact with the striker 195. However, the rollers 217 are positioned at such distances apart that striker 195 may extend between them without holding either switch in circuit closing position.

The operation of the cylinder aligning mechanism described above is as follows: In the event that the strip S shifts laterally, i. e., in a direction crosswise of the machine and axially of the coating cylinders 24 and 25, this shifting movement will be transmitted to one of the shoes 178 or 179. As a result, the detector bar 175 will shift accordingly and bring the roller 217 of one of the switches 216 and 217 into contact with the striker 195. A circuit will thereby be closed to the motor 210 to rotate the worm shaft 208 and worm wheel 205 in the proper direction. Because worm wheel 205 cannot move toward or from the frame 20, the sleeve 193 and the coating cylinder shaft 67 will move transversely of the frame so that the upper coating cylinder 25 will be kept in a centered position with respect to the strip. As soon as the cylinder 25 is in properly centered position, striker 195 will move out of engagement with the switch roller 217 which contacted with it and motor 210 will cease operation.

The brackets 181 of the strip engaging elements 178 and 179 are ordinarily so positioned on bar 175 that the shoes 184 will contact lightly with the edges of the strip so that bar 175 will shift crosswise if the strip shifts. The springs 182 exert sufficient tension that the slides 180 are thus normally immovable with respect to bar 175. However, in the event that the strip shifts too markedly, the springs 182 will enable the slides 180 to move relative to the bar 175 to prevent damage to the switches 215 and 216.

It will be observed from Figure 5 that the pinion 135 of upper coating cylinder 25 is somewhat wider than the pinion 136 of the lower cylinder 24. This insures that the two pinions will always have a sufficient area in contact regardless of any shifting of the upper cylinder.

In the illustrated embodiment, the upper and axially movable cylinder 25 has less length than the lower cylinder and also less width than the strip S. This insures that the upper coating will only be applied to a predetermined central area of strip S, usually extending between points spaced about ¼" from the edges of the strip disclosed, which is approximately thirty inches wide. The lower cylinder will be longer than the strip width to insure that the entire lower face of the strip will be coated, regardless of any shifting of the strip.

Strip bowing device

As had been explained in my original application, it is desirable to bow or arch the strip immediately after it has been coated so that it can be supported by devices which will only engage its edges. With the strip in this condition, and supported only by its edges, the wet coating on the faces of the strip cannot be marred before it has been dried.

Figures 2, 13:
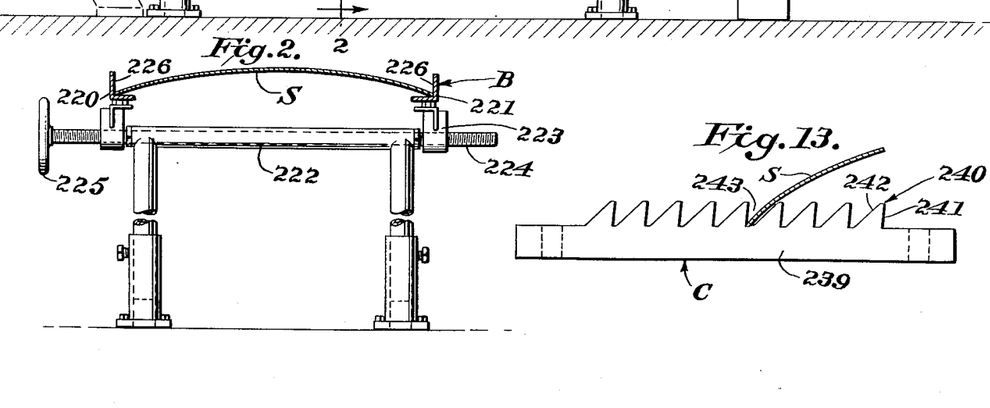
Figure 2 is a transverse vertical section on the line 2—2 of Figure 1.
Figure 13 is a side view of a strip engaging element provided on the drying oven conveyor.
Figure 10:
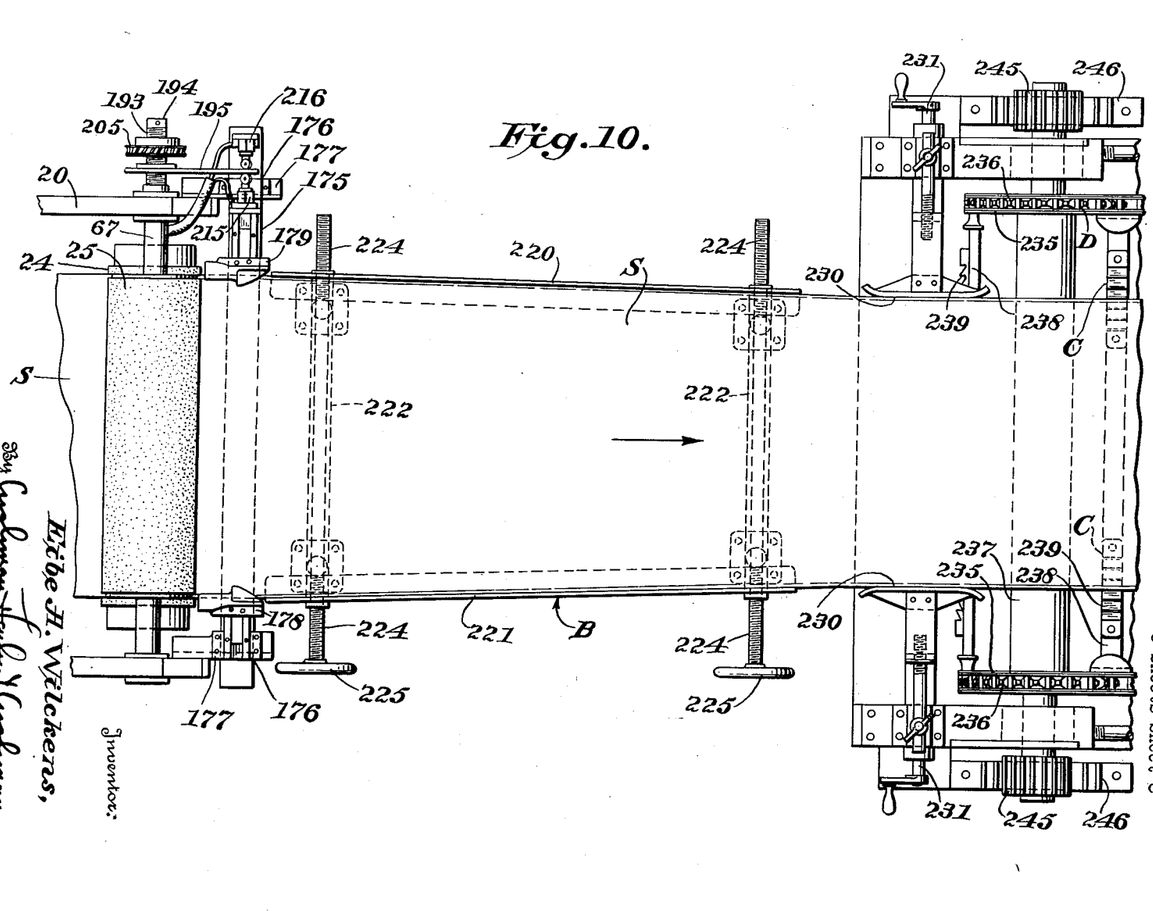
Figure 10 is a plan view showing the outfeed portion of the coating mechanism and the infeed portion of the drying oven.

In order to bow the strip after it leaves the coating machine, the bowing mechanism B includes a pair of angled members 220 and 221 mounted on a support 222 as best shown in Figures 2 and 10, so that the members 220 will extend alongside the strip. Each member 220 is pivotally carried by brackets such as 223 threadedly mounted on a right and left-handed threaded shaft 224 provided with a hand wheel 225. By this arrangement, the ends of both angled members can be simultaneously adjusted toward and away from each other. As shown in Figure 2, the standards for the elements 222 are vertically adjustable. Referring to Figure 10, the ends of the angled members 220 and 221 which are distant from the coating machine are positioned closer together than their opposite ends so that the angled members converge toward their distant ends. As the strip leaves the coating machine, its edges engage the upstanding walls 226 of the angled members and because the members converge, the strip is bowed or arched upwardly.

When the end of a strip first moves from the coater, it must be bowed upwardly by hand, but once that has been done, the remainder of the strip length will bow by the action of the members 220 and 221.

The members 220 and 221 are positioned with their ends nearest the drying oven sufficiently lower than their other ends that a plane midway of the height of the bowed strip will lie in the same plane as the unbowed strip.

*Drying oven conveyor*

The infeed end of the drying oven is positioned immediately adjacent to the outfeed ends of the angled or strip bowing members 220 as shown in Figure 10 and shoes 230 including faces parallel to the edges of the strip S are secured to the drying oven frame at this point. The shoes are movable toward and from the edges of the strip by means of threaded adjusting means generally indicated by the numeral 231 and which may be locked in adjusting position.

The drying oven conveyor D comprises spaced chains 235 which, at the infeed of the oven, move about sprocket wheels 236 fixed to a sleeve 237 rotatable on a shaft 237a. The conveyor 235 may be driven by a sprocket, not shown, at the outlet end of the drying oven. The conveyor chains 235 are connected by flights 238, which flights support strip holders 239 best shown in Figure 13. As is illustrated in the last mentioned figure, each strip holder includes a number of teeth 240, each of which includes an inner face 241 which is slightly inclined to the vertical so that its upper end is slightly closer to the center line of conveyor D than its lower end. The strip holders 239 at opposite ends of a flight 238 thereby have the walls 241 of their teeth inclined toward the center line of the conveyor. The opposite or outer face 242 of each tooth is arranged on an angle of substantially 45°. As is indicated in Figure 13, an edge of the strip S can seat in the pocket 243 defined by two adjacent teeth 240 without any portion of either face contacting with the walls of the teeth. As a result, the strip will only be supported by its edges. It is found that the contact of the elements 239 with the strip is so exclusively confined to the edges of the strip by proper bowing that the under face of the strip can be the face which is coated over its entire surface, as disclosed herein.

The above-described edge contact of the strip with the holders 239 results in sufficient friction that the conveyor D will exert some pull upon the strip to move it through the coating cylinders and oven. Pulling effort exerted upon the edges of the strip by the elements 239 is desirable because if all of the pull necessary to move the strip through the coating cylinders and oven is exerted by the re-winding drum or pinch rolls, the strip may collapse from its arched condition and its coating will be marred.

The outfeed end of the guide members 220 of the bowing mechanism B and the shoes 230 will be adjusted to such position that when the strip S leaves them, it will be bowed to the desired extent and its edges will closely conform to the opposed inner walls 241 of a strip holder 239 at each side of the conveyor. Then, as a conveyor flight 238 moves up about the idler sprocket 236, the walls 241 of the selected teeth 240 will gradually engage the opposed edges of the strip. By providing the strip holders with a number of teeth, different widths of strip may be handled or the bowing may be varied. However, it will be observed that such adjustment as is necessary at the infeed end need only be performed on the bowing mechanism B and the shoes 230.

At the outfeed end of the drying oven the strip holders will simply move down and away from the strip and it may then flatten under control of shoes such as 230 and an apparatus such as B, but with the angled members diverging at their ends distant from the oven.

*Conveyor tensioning mechanism*

The conveyor D and the drying oven enclosing it may be approximately two hundred feet in length and the heat maintained in the drying oven may cause the conveyor to expand in length as much as five or six inches from its condition when the oven is at normal atmospheric temperature. In order to compensate for this expansion and maintain the conveyor at a uniform tension, the mechanism E best shown in Figure 11 is provided. This arrangement involves the provision on each end of the conveyor shaft 237a of pinions 245 which mesh with stationary racks 246 secured to the oven frame. In addition, the ends of the shaft 237a are journaled in slides 248 movable in suitable slideways extending longitudinally of the oven frame. The slides 248 are secured to the outer ends of piston rods 249 movable in cylinders 250 which are connected by lines to a suitable source of air or other fluid pressure. This pressure maintains the piston rods 249 and idler shaft 237a to the left as view in Figure 11 and under constant tension. In a typical installation, air pressure at one hundred pounds supplied through the lines 251 will maintain the conveyor D under uniform tension regardless of expansion by reason of the oven heat.

After the strip S has been dried by movement through the drying oven of said original application and has resumed a flat condition, it may move through a looper to a power-driven re-winding or coiling drum which cooperates with the sheet edge engaging elements C of conveyor D to move the strip through the coater and oven. The looper beyond the outfeed end of the oven enables the strip to be cut after a roll has been formed and without stopping movement of the strip. The looper in advance of the coating mechanism A will enable strip from a second roll to be secured to that moving through the apparatus so that continuous operation will be obtained.

It will be noted that the aparatus includes features applicable to the handling of relatively short sheets. Also, though the apparatus has been primarily described as coating different colors or compositions on opposite sides of a strip, it will be understood that it may be used to coat one color or compound on both surfaces. When so used, no uncoated margin need be left on the strip and the manner in which the strip is supported by the elements C will still prevent the coating from being marred.

The terminology used in the specification is for the purpose of description and not of limitation, the scope of the invention being indicated in the claims.

I claim:

1. In an apparatus of the class described, a coating couple adapted to have strip material moved therethrough for coating, and means including idler rolls adapted to engage the strip to be coated so as to be driven thereby and to impart such drive to the coating couple.

2. In an apparatus of the class described, a coating couple adapted to have strip material moved therethrough for coating, a coating element of said couple being movable from normal coating position, means including idler rolls adapted to engage the strip to drive the couple, and means to maintain said last-named means in driving relationship with said couple when the movable element of said couple is out of normal coating position.

3. In an apparatus of the class described, a frame, a pair of opposed coating cylinders adapted to have strip material moved therebetween for coating, at least one of said cylinders being movable in said frame out of engagement with the strip, means engaging the strip to impart a drive to said cylinders, and means to maintain said movable cylinder in driving relationship with the other cylinder when the movable cylinder is out of engagement with the strip.

4. In an apparatus of the class described, a frame, a coating couple adapted to have strip material moved therethrough for coating, the cylinders of said couple being movable in said frame to a position out of contact with the strip moving therethrough, means engaging the strip to impart a drive to a cylinder of the couple, means to maintain said drive when the cylinders are out of contact with the strip, means connecting the cylinders of the couple in driving relationship irrespective of whether the cylinders are in engagement with the strip, and means to move said last-named means longitudinally of the strip and toward said couple when the elements of the couple are moved out of engagement with the strip.

5. In an apparatus of the class described, a frame, a pair of opposed coating cylinders adapted to coat a strip, means to move a strip between said cylinders, a pair of opposed rolls adapted to engage the strip and be rotated thereby, a drive connecting one roll and one cylinder to drive said cylinder, said cylinders having gears fixed thereto whereby the other cylinder will be rotated from said drive cylinder, means to move said cylinders apart and out of contact with the strip, means to maintain said cylinder drive when said cylinders are moved apart, and gear means to maintain the cylinder gears in position to mesh when the cylinders are moved apart and said gears are not fully meshed.

6. An apparatus of the character defined in claim 5 wherein said cylinders are movable away from the strip along diverging lines, and means effective when said cylinders are moved away from the strip to move said gear means toward said cylinders along a line bisecting the angle between said diverging lines.

7. In an apparatus of the class described, a frame, a pair of opposed coating cylinders journaled in bearings in said frame, a pinion carried by each of said coating cylinders, said pinions normally being adapted to mesh, means to move said cylinders away from each other, and means to maintain said pinions in proper relationship for subsequent synchronized meshing while they are out of normal meshing position.

8. In an apparatus of the class described, a frame, a pair of opposed coating cylinders journaled in bearings in said frame, a pinion carried by each of said coating cylinders, said pinions normally being adapted to mesh, means to move said cylinders away from each other, and means to drive said cylinders and maintain said pinions in proper relationship for subsequent synchronized meshing while they are out of normal meshing position.

9. In an apparatus of the class described, a frame, a pair of opposed coating cylinders journaled in bearings in said frame, a pinion carried by each of said cylinders, means to move said cylinders apart, and means to maintain said pinions in proper relationship when the cylinders are apart comprising a train of gears movable in a direction transversely of the path of movement of said cylinders.

10. In an apparatus of the class described, a frame, a strip coating couple, a pinch roll couple adapted to be rotated by a contact with the strip, a driving connection between the pinch roll couple and the coating couple, and means to move one end of the pinch roll couple toward and away from said coating couple.

11. In an apparatus of the class described, a frame, a strip coating couple, a pinch roll couple adapted to be rotated by a contact with the strip, a driving connection between the pinch roll couple and the coating couple, and means to move one of the rolls of said pinch roll couple relative to the other roll thereof.

12. In an apparatus of the class described, a frame, a pair of coating cylinders, bearings for said cylinders movable in said frame along diverging paths, a pair of pinch rolls, a flexible driving connection between one of said pinch rolls and one of said cylinders, and means to maintain said flexible driving connection under tension during movement of said cylinders.

13. In an apparatus of the class described, a frame, a pair of coating cylinders, bearings for said cylinders movable in said frame along diverging paths, and means to move said movable bearings along said paths comprising slides mounted on said frame, a rotatable shaft, and link and crank connections between said slides and shaft.

14. In an apparatus of the class described, a frame, coating means, a detector element adapted to engage the edges of a sheet moving in contact with said coating means, a threaded element extending laterally from, secured to, and freely rotatable with respect to said coating means, a driving member threaded on said last-named element, means to hold said member against movement toward and away from said frame, a pair of opposed circuit closing devices carried by said detector element, an arm mounted at a fixed point with respect to the coating means length and extending laterally of said frame between said circuit closing devices, a reversible electric motor controlled by said devices, and a driving connection between said motor and driving member.

EIBE A. WILCKENS.

REFERENCES CITED

The following references are of record in the file of this patent:

UNITED STATES PATENTS

| Number | Name | Date |
|---|---|---|
| Re. 13,412 | Norton | Apr. 30, 1912 |
| 571,527 | Honiss et al. | Nov. 17, 1896 |
| 607,624 | Niedringhaus | July 19, 1898 |
| 834,588 | Odenkirchen et al. | Oct. 30, 1906 |
| 1,170,383 | Wood | Feb. 1, 1916 |
| 1,203,303 | Bickett | Oct. 31, 1916 |
| 1,295,820 | Watkins | Feb. 25, 1919 |
| 1,427,858 | Schlieper | Sept. 5, 1922 |
| 1,463,923 | Nelson | Aug. 7, 1923 |
| 1,568,605 | Hough | Jan. 5, 1926 |
| 1,663,344 | Lennard | Mar. 20, 1928 |
| 1,769,348 | Krummel | July 1, 1930 |
| 1,789,853 | Watkins | Jan. 20, 1931 |
| 1,888,309 | Cramer | Nov. 22, 1932 |
| 2,236,239 | Lipton | Mar. 25, 1941 |
| 2,257,261 | Knowlton | Sept. 30, 1941 |
| 2,402,860 | Wilckens | June 25, 1946 |
| 2,438,787 | Nicholas | Mar. 30, 1948 |